US007076117B2

(12) United States Patent
Biermann et al.

(10) Patent No.: US 7,076,117 B2
(45) Date of Patent: Jul. 11, 2006

(54) METHODS AND APPARATUS FOR CUT-AND-PASTE EDITING OF MULTIRESOLUTION SURFACES

(75) Inventors: Henning Biermann, Woerrstadt (DE); Ioana M. Martin, Pelham Manor, NY (US); Fausto Bernardini, New York, NY (US); Denis Zorin, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 10/152,258

(22) Filed: May 20, 2002

(65) Prior Publication Data

US 2002/0191863 A1 Dec. 19, 2002

Related U.S. Application Data

(60) Provisional application No. 60/299,231, filed on Jun. 19, 2001.

(51) Int. Cl.
*G06K 9/36* (2006.01)
(52) U.S. Cl. .................................................... 382/285
(58) Field of Classification Search ................ 382/103, 382/151, 154, 284, 285, 294, 309, 311; 345/419; 348/578, 580
See application file for complete search history.

(56) References Cited

U.S. PATENT DOCUMENTS

2002/0012013 A1* 1/2002 Abe et al. .................... 345/764

OTHER PUBLICATIONS

Ma "The direct manipulation of paste surfaces", a thesis, University of Waterloo, Ontario, Canada, pp. 1-73, 2000.*
Barghiel, et al. "Pasting spline surfaces", Mathematical Methods in CAGD III, pp. 1-10, 1995.*
Furukawa, et al. "Cut-and-paste editing based on constrained b-spline volume fitting", Computer Graphics International, pp. 1-4, 2003.*
Floater "Parameterization and smooth approximation of surface triangulations", Computer Aided Geometric Design, pp. 232-250, 1997.*
Guskov et al. "Normal Meshes", Proceedings of SIGGRAPH 2000, 95-102.
Kimmel et al., "Computing Geodesic Paths on Mauifolds", Proc. National Academy of Sciences, 95 (15):8431-8435, 1998.

(Continued)

*Primary Examiner*—Daniel Miriam
(74) *Attorney, Agent, or Firm*—Louis P. Herzberg; Harrington & Smith, LLP

(57) ABSTRACT

In this invention there are described a set of algorithms based on multiresolution subdivision surfaces that perform at interactive rates and enable intuitive surface cut-and-paste operations. The method includes separating a source region of interest of a source surface into a source base surface and a source detail surface; separating a target region of interest of a target surface into a target base surface and a target detail surface; and pasting the source detail surface onto the target base surface in accordance with a mapping. The step of pasting includes parameterizing and mapping the parameterized regions of interest of the source and target surfaces into an intermediate plane, and aligning the parameterizations using a linear transformation that compensates for first order distortions.

32 Claims, 15 Drawing Sheets

OTHER PUBLICATIONS

Kobbelt, "A Variational Approach to Subdivision", Comput. Aided Geom. Design, 13 (8):743-761, 1996.

Kobbelt, "Discrete Fairing and Variational Subdivision for Freeform Surface Design", The Visual Computer, 16(3-4):142-150, 2000.

Polthier et al., "Straightest Geodesics on Polyhedral Surfaces", Mathematical Visualization, Springer Verlag, 1998.

Krishnamurthy et al., "Fitting Smooth Surfaces to Dense Polygon Meshes", Holly Rushmeier, eidtor, SIGGRAPH 96 Conference Proccedinga, Annual Conference Series, 313-324, Acm SIGGRAPH, Addison Wesley Aug. 1996.

Kuryama et al., "Discrete Parameterization for Deforming Arbitrary Meshes" Graphics Interface, 132-139, Jun. 1999.

Lee et al., "Displaced Subdivision Surfaces", SIGGRAPH 2000, 85-94.

Lee et al., "MAPS: Multiresolution Adaptive Parameterization of Surfaces", SIGGRAPH 1998, 95-104.

Levy et al., "Non-Distorted Texture Mapping For Sheared Triangulated Meshes", SIGGRAPH, 1998, 343-352.

Maillot et al., "Interactive Texture Mapping", SIGGRAPH, 1993, 27-34.

Oberknapp et al., "An Algorithm for Discrete Constant Mean Curvature Surfaces", Visualization and Mathematics (Berlin-Dahlem 1995) 141-161.

Pederson, "Decorating Implicit Surfaces", SIGGRAPH, 1995, 291-300.

Pederson, "A Framework for Interactive Texturing Operations on Curved Surfaces", SIGGRAPH, 1996, 295-302.

Pinkall et al., "Computing Discrete Minimal Surfaces and Their Conjugates", Experiment, Math 2(1):15-36, 1993.

Praun et al., "Lapped Textures", SIGGRAPH 2000, 465-470.

Pulli et al., "Hierarchical Editing and Rendering of Subdivision Surfaces", Technical Report UW-CSE 97-04-07m Dept. of CS&E University of Washington, Seatle, WA, 1997.

Sheffer et al., "Surface Parameterization for Meshing by Triangulation Flattening", Proc. 9th International Meshing Roundtable, 161-172, 2000.

Stam, "Exact Evaluation of Catmull-Clark Subdivision Surfaces At Arbitrary Parameter Values", SIGGRAPH 1998, 395-404.

Suzuki et al., "Interactive Mesh Dragging with Adaptive Remeshing Technique", The Visual Computer, 16(3-4):159-176, 2000.

Zorin et al., "Interpolating Subdivision for Meshes with Arbitrary Topology", SIGGRAPH, 1996, 189-192.

Zorin et al., "Interactive Multiresolution Mesh Editing", SIGGRAPH 1997, 259-268.

Eck et al., "Multiresolution Analysis of Arbitrary Meshes", SIGGRAPH, 1995, 173-182.

Freitag et al., "An Efficient Parallel Algorithm for Mesh Smoothing", SIAM J. Sci. Comput. 20(6):2023-2040, 1991.

* cited by examiner

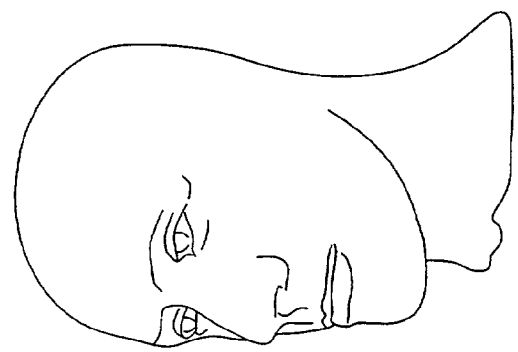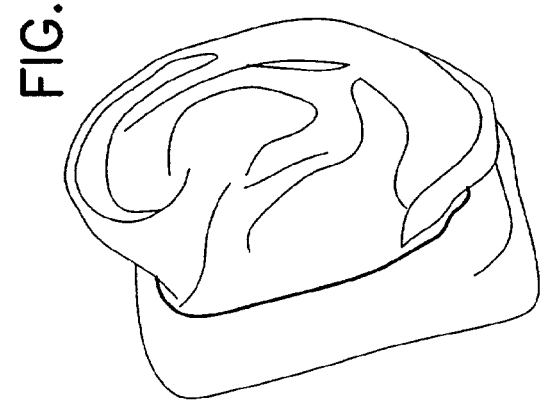

METHODS AND APPARATUS FOR CUT-AND-PASTE EDITING OF MULTIRESOLUTION SURFACES

CLAIM OF PRIORITY FROM A COPENDING PROVISIONAL PATENT APPLICATION

The U.S. Patent Application claims priority under 35 USC 119(e) from U.S. Provisional Patent Application No.: 60/299,231, filed Jun. 19, 2001, now abandoned, the disclosure of which is incorporated by reference herein in its entirety.

TECHNICAL FIELD

The field of the invention is that of forming and manipulating digital representations of images of surfaces; in particular, manipulations performed using a computer.

BACKGROUND OF THE INVENTION

The pasting and blending images is one of the common operations implemented by most image manipulation systems. Such operations are a natural way to build complex images from individual pieces originating from different sources. For example, photographs can be easily combined with hand-drawn and computer generated images.

In contrast, pasting and blending tools are difficult to locate for surfaces. Most geometric modeling systems expect the user to manipulate control points of NURBS, individual mesh vertices and polygons, or to use conventional higher-level operations, such as volume deformations and boolean operations. In an image processing system, vertex and control point manipulation is equivalent to painting an image pixel-by-pixel. While it may be useful to have access to such low-level operations in certain cases, most image manipulations are performed using higher-level operations.

The concept of surface pasting was introduced in the work of Bartels, Mann and co-workers in the context of hierarchical splines. However, these authors did not specifically consider the more general surface types, and furthermore assumed that separate detail and base surfaces are given.

Moving existing features on a mesh was explored by Suzuki et al. An advantage of this approach is that no resampling of the repositioned feature is performed. However, continuous remeshing is required, which limits the complexity of the objects and features that can be handled. In addition, the issues of pasting features between surfaces and separation into base and detail are not considered by these authors.

The task of base/detail separation is similar to the construction of displaced subdivision surfaces. Parameterization algorithms are necessary for many geometric modeling and texturing applications, and a variety of algorithms have been proposed, including general parameterization algorithms in the context of reparameterization (changing connectivity to semi-regular) and texture mapping. Kuriyama and Koneko used local parameterizations to add offsets to a surface. The work of Pedersen on interactively placing textures on implicit surfaces is also relevant as it requires dynamic reparameterization of surface regions, similar to pasting.

As can be appreciated, the problems related to cutting and pasting images, and the blending of images from different sources, are still far from being adequately resolved.

SUMMARY OF THE INVENTION

This invention provides a method for the interactive cut-and-paste editing of multiresolution surfaces.

A benefit derived from the use of this invention is the separation of both target and source surfaces into base and detail surfaces. Another benefit of the invention is the identification of an area on the target surface where a feature should be pasted. A further benefit of the invention is the generation of mappings between the source and target surfaces. Still another benefit of the invention is the resampling of the source feature onto the target topology. One still further benefit derived from the use of the invention is the blending of source detail with the target detail to produce the pasted feature on the target surface.

Until this invention no algorithms were available that combined a number of important properties. The method of this invention uses in a preferred embodiment a variation of the parameterization algorithm by Sheffer and Sturler, and a portion of the construction of base surfaces is related in some degree to the Kobbelt et al. work on variational subdivision, and also draws upon on the work of Polthier et al.

The algorithm in accordance with this invention, while acknowledging earlier efforts by others in the field, is novel, and combines certain known techniques and variations of known techniques with novel techniques in a unique manner. The resulting algorithm provides benefits not found in the prior art, and also satisfies the need felt in the prior art for an improved surface processing methodology.

Described herein is a technique for performing an interactive cut-and-paste editing of surfaces, which is an important instance of a natural operation on a surface. The presently preferred methods enable a variety of useful operations that are difficult to perform using existing techniques. For example, in the design of auto body parts it is common to work in parallel on a digital mock-up and on a clay model. Using the cut-and-paste technique, a designer can paste a logo obtained by 3-D laser scanning onto a surface modeled using a computer modeling system and import features from a library of predefined shapes and/or copy parts of a design from a another project.

Multiresolution subdivision surfaces are preferred for use as the underlying representation. The preferred computer representation is a semi-regular control mesh for the surface, and most of the operations are performed on semi-regular control mesh. The associated limit surface is used for computing quantities such as tangents and normals, as well as for additional refinement when necessary for antialiasing. This is similar in some respects to pixel representations of images: when images are scaled or rotated, they are typically assumed to be sampled representations of smoothly varying continuous images (e.g., obtained by cubic interpolation).

The regular and hierarchical structure of the surface representation makes it possible to perform operations on detailed surfaces interactively. In many ways, using this representation makes surface manipulation similar to image manipulation: almost everywhere the connectivity of the mesh approximating the surface is locally regular.

At the same time, many common problems specific to geometry are addressed. These include the lack of a common parameterization domain for separate surfaces, the lack of a unique best parameterization domain for the surfaces, and the separation of surface features.

The pasting operation proceeds as follows: the user selects an area on the source surface. The source surface is separated into base and detail surfaces, such that the detail surface represents a vector offset over the base surface. Next, the user specifies a location and an orientation on the target surface where a source region is to be pasted, and interactively adjusts the position, orientation and size of the pasted feature.

A computer implemented method is disclosed herein for pasting detail from a multiresolution subdivision representation of a source surface onto a multiresolution subdivision representation of a target surface. The invention can be embodied as a method, and as a system that operates in accordance with the method, and as a computer-readable media that stores instructions that implement the method. The method includes separating a source region of interest of the source surface into a source base surface and a source detail surface; separating a target region of interest of the target surface into a target base surface and a target detail surface; and pasting the source detail surface onto the target base surface in accordance with a mapping. The step of pasting includes parameterizing and mapping the parameterized regions of interest of the source and target surfaces into an intermediate plane, and aligning the parameterizations using a linear transformation that compensates for first order distortions.

In the preferred embodiment the pasting step includes a fitting procedure, preferably an interactive fitting procedure, for smoothing a mesh representation of at least the source base surface.

The pasting step includes making a determination of a target region on the target surface, and determining the target region has steps of (a) representing a boundary of the source region in a generalized radial form; (b) using geodesics on the target surface to map source region boundary points to the target region; and (c) connecting the boundary points on the target region and filling in the interior region. In an interactive mode a user draws a curve that is interpreted as a spine of a feature used in mapping the feature to the target surface, while in an automatic mode a point is selected to serve as a spine of a feature used in mapping the feature to the target surface.

Preferably the point corresponds to a centroid of the boundary of the parameterization.

DETAILED DESCRIPTION OF THE INVENTION

Figure 2:
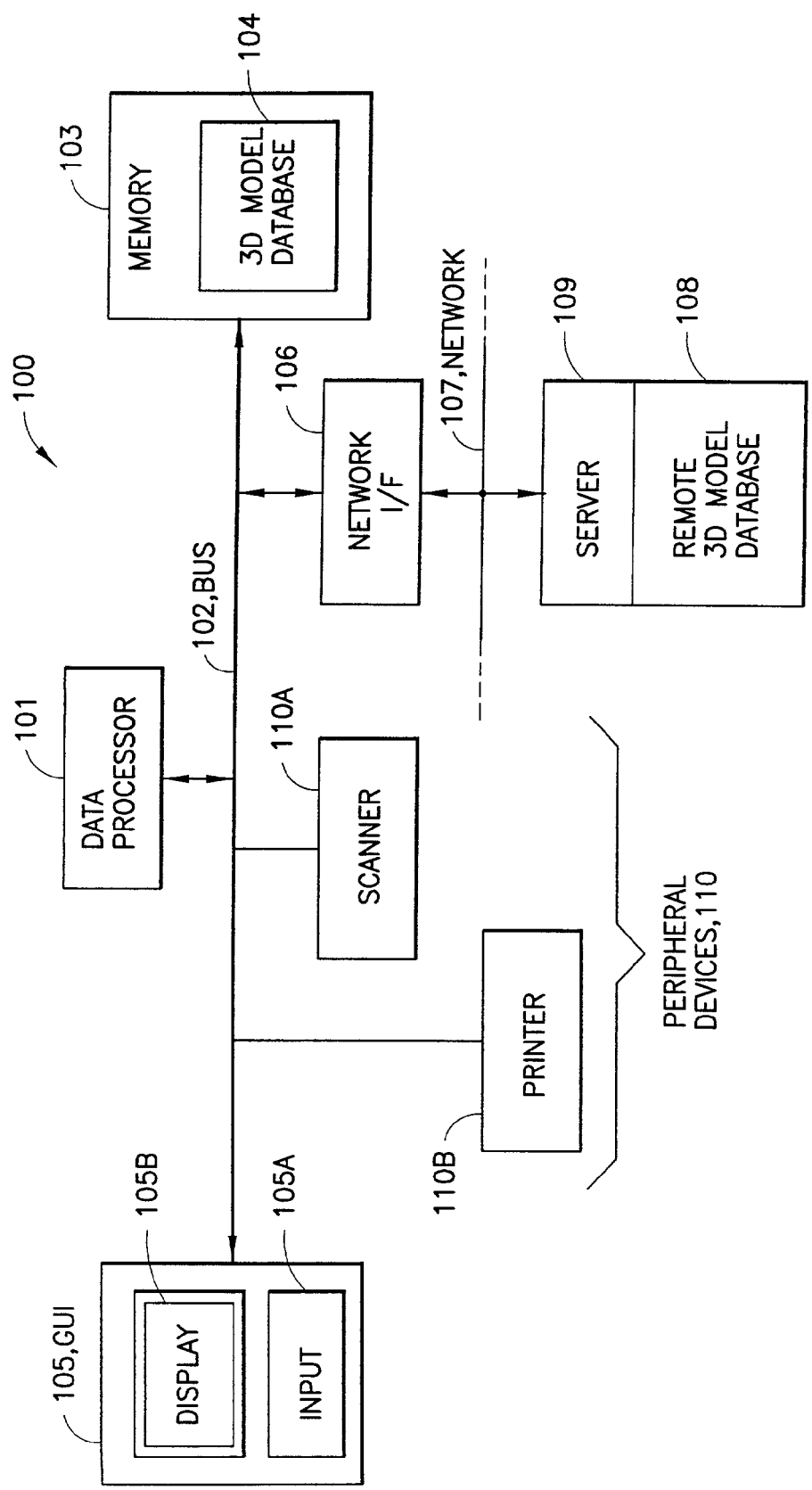
FIG. 2 illustrates an embodiment of a data processing that is suitable for practicing this invention.
Figure 3:
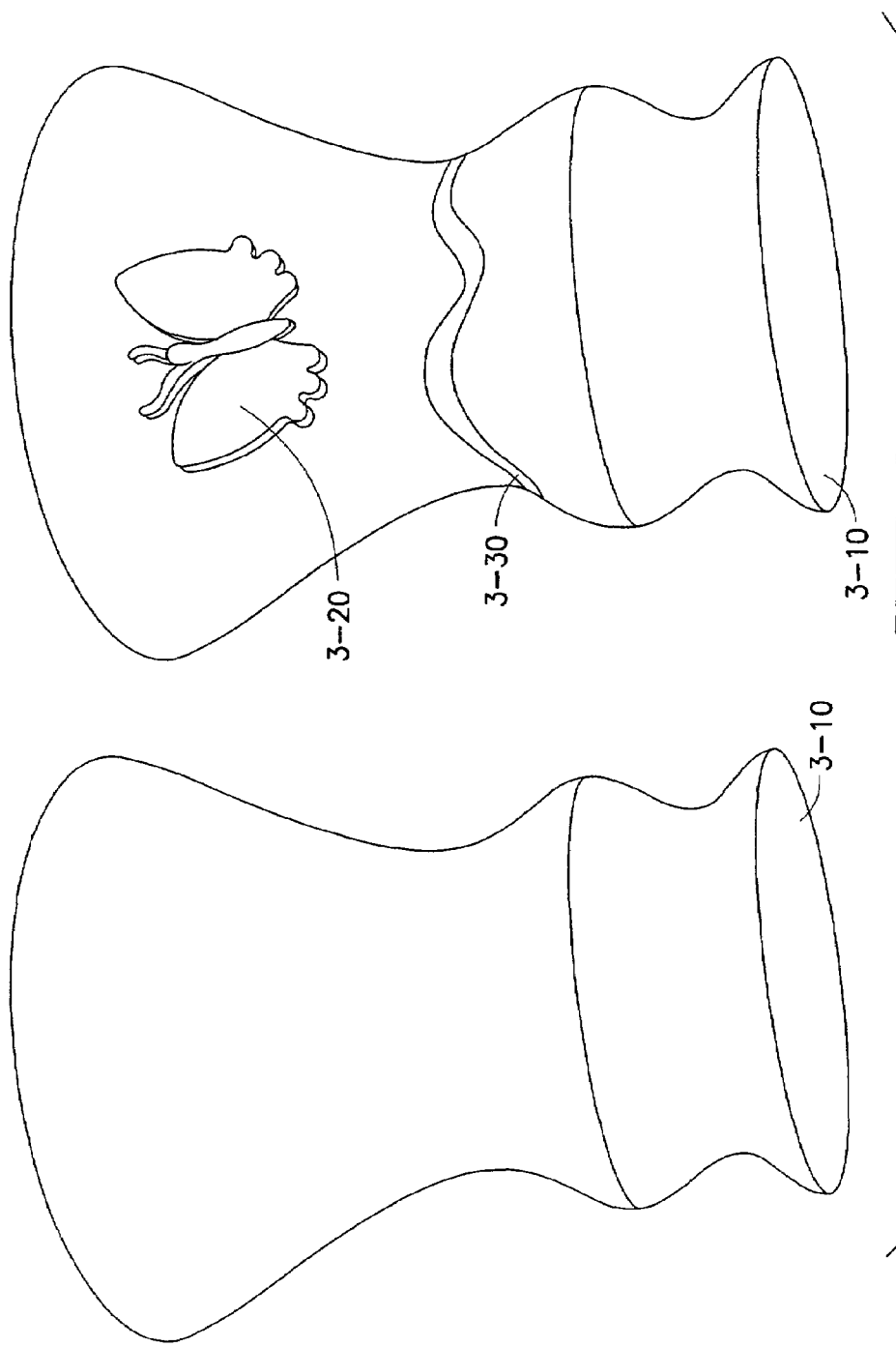
FIG. 3 illustrates an example of a pasting operation.

FIG. 2 is a simplified block diagram of a data processing system 100 that is suitable for practicing this invention. The data processing system 100 includes at least one data processor 101 coupled to a bus 102 through which the data processor 101 may address a memory sub-system 103, also referred to herein simply as the memory 103. The memory 103 may include RAM, ROM and fixed and removable disks and/or tape. The memory 103 is assumed to store a program containing program instructions for causing the data processor 101 to execute methods in accordance with the teachings of this invention. Also stored in the memory 103 can be at least one database 104 of digital 3D models, such as models of objects, certain non-limiting examples of which are shown in FIGS. 3, 13 and 14. The digital model data may include models obtained by scanning real objects using a 3D scanner, digital models created using a computer, models imported from existing databases, and/or models generated by or derived from any suitable means. In general, the digital model data may be any desired type or types of 3D models, including but not limited to digital models of persons, places, animals, plants, mechanical parts and assemblies, packaging, containers, abstract forms and so forth.

The data processor 101 is also coupled through the bus 102 to a user interface, preferably a graphical user interface (GUI) 105 that includes a user input device 105A, such as one or more of a keyboard, a mouse, a trackball, a voice recognition interface, as well as a user display device 105B, such as a high resolution graphical CRT display terminal, a LCD display terminal, or any suitable display device.

The data processor 101 may also be coupled through the bus 102 to a network interface 106 that provides bidirectional access to a data communications network 107, such as an intranet and/or the internet. Coupled to the network 107 can be one or more sources and/or repositories of digital models, such as a remote digital model database 108 that is reachable through an associated server 109.

The data processor 101 is also preferably coupled through the bus 102 to at least one peripheral device 110, such as a scanner 110A (e.g., a 3D scanner) and/or a printer 110B and/or a 3D model making apparatus, such as a rapid prototyping system, and/or a computer controlled fabrication system.

In general, this invention may be implemented using one or more software programs running on a personal computer, a server, a microcomputer, a mainframe computer, a portable computer, and embedded computer, or by any suitable type of programmable data processor 101. The use of this invention substantially improves the manipulation of 3D model data for cut-and-paste operations. The teachings of this invention can also be configured to provide interactive, real-time or substantially real-time processing of 3D model information. The methods may be used to process the digital 3D model data stored in the 3D model database 104 and/or in the remotely stored 3D model database 108 over the network 107 and in cooperation with the server 109. As but one example, a 3D model source surface having a desired detail could be remotely stored in the 3D model database 108, while the 3D model target surface where the detail is to be pasted could be stored in the local 3D model database 104.

Figure 1:
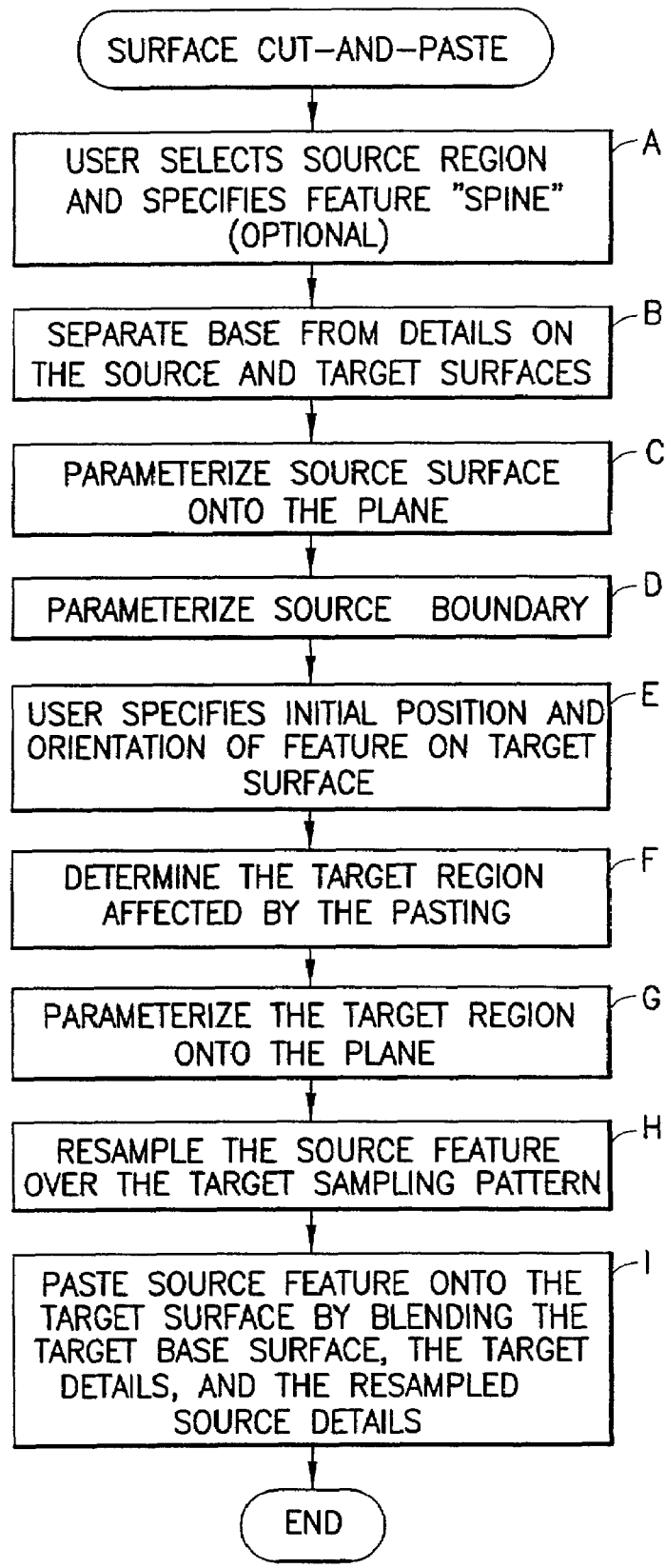
FIG. 1 illustrates the steps in the inventive method.

By way of introduction, the main steps of the presently preferred algorithm are illustrated in FIGS. 1 and 6, and are described as follows.

Figure 9:
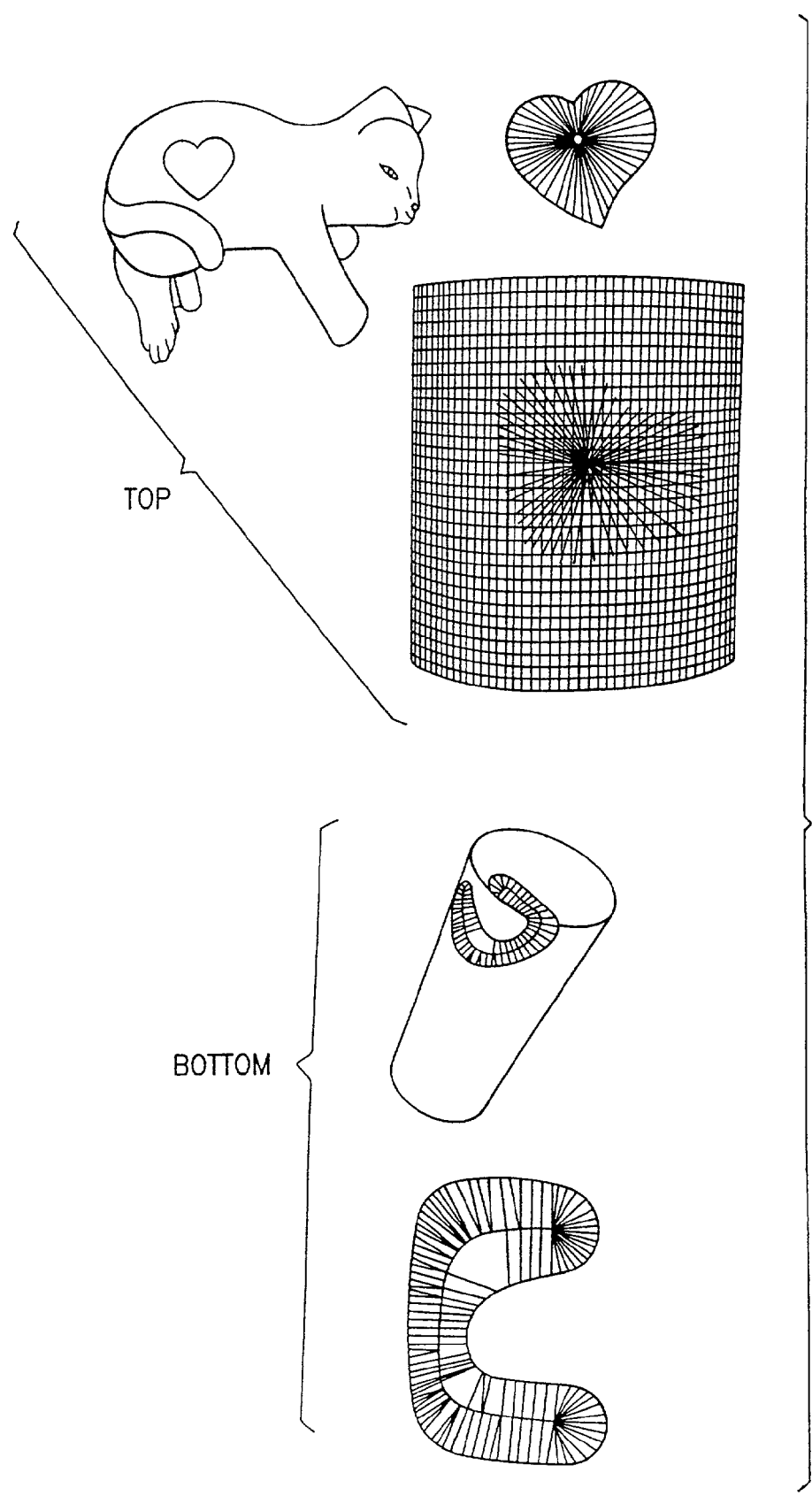
FIG. 9 illustrates the steps involved in the process of determining the target region.

Step A. The user marks a region on the source surface and optionally specifies a spine. The spine of a region is a collection of curves that capture the general shape of the region. It approximates the medial axis of the selected region and can be used by the system 100 for mapping the source to the target. Reference can also be made to FIG. 9.

Figure 8:
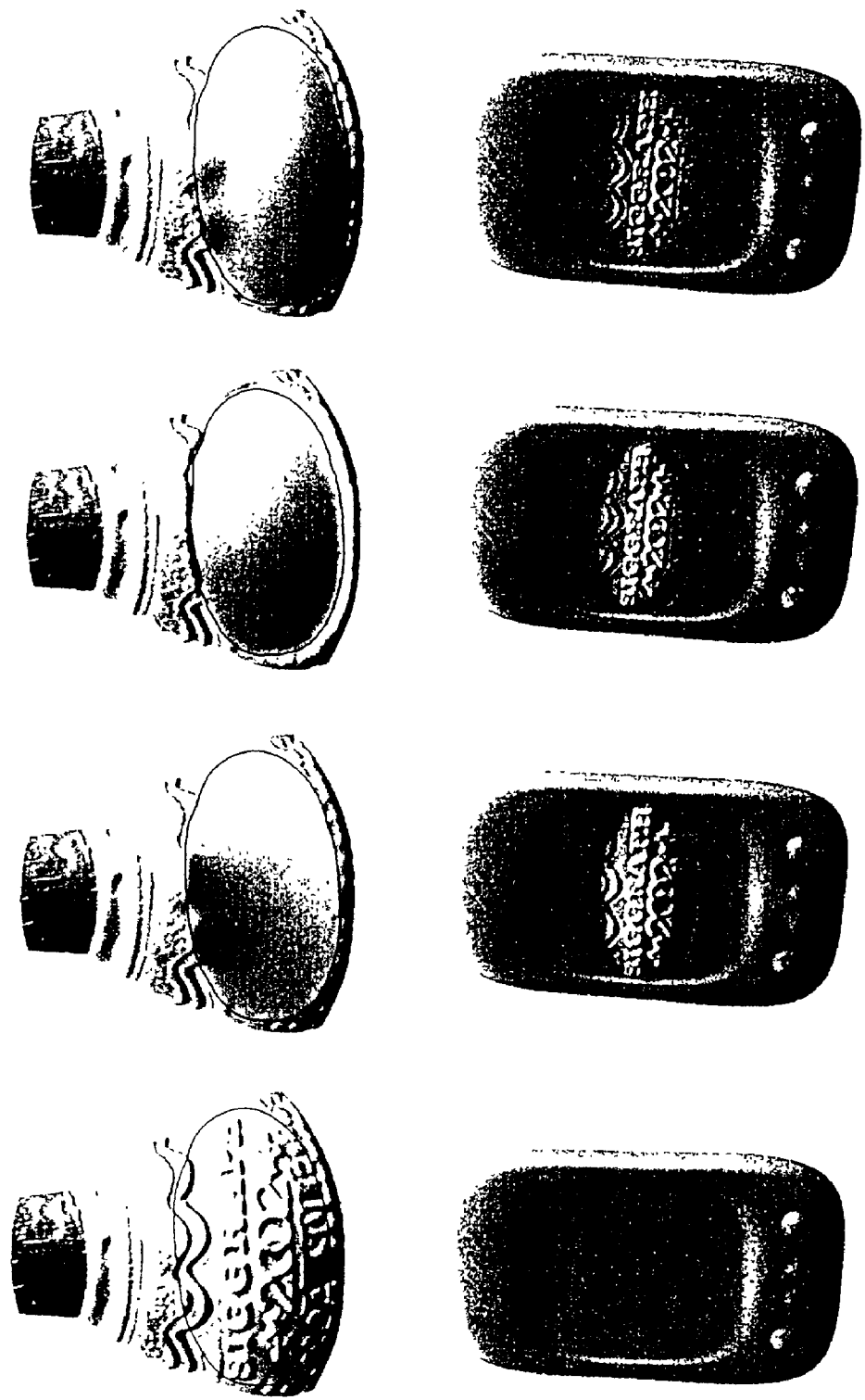
FIG. 8 illustrates different choices of base surfaces and the corresponding scales of the shape details transferred to the target.

Step B. The details are separated from the base on the source and target surfaces. The user may interactively select a base surface from a continuous range, interpolating between a zero level given by a membrane surface and the actual surface. Reference can also be made to FIG. 8.

Step C. The source region is parameterized over the plane.

Step D. The boundary of the source region is parameterized by distance and direction from the spine and a covering by disks is computed.

Step E. The user positions at least one point of the spine on the target, and specifies an orientation.

Step F. A target region for pasting is determined on the target surface using geodesic disks.

Step G. The target area is mapped to a common plane with the source.

Step H. The source is resampled over the target sampling pattern.

Step I. The resulting surface is computed by blending the target base surface, the source surface resampled details, and the target details. In this step the user may specify different blending modes.

As an aid in further understanding the teachings of this invention, a discussion will now be made of multiresolution subdivision surfaces.

Subdivision defines a smooth surface recursively as the limit of a sequence of meshes. Each finer mesh is obtained from a coarser mesh by using a set of fixed refinement rules. Examples of suitable rules are the Loop or the Catmull-Clark subdivision rules. In the preferred implementation Catmull-Clark rules are used, but this is not a limitation upon the practice of this invention. Multiresolution surfaces extend subdivision surfaces by introducing details at each level. Each time a finer mesh is computed, it is obtained by adding detail offsets to the subdivided coarser mesh. If given a semi-regular mesh, i.e., a mesh with subdivision connectivity, one can easily convert it to a multiresolution surface by defining a smoothing operation to compute vertices on a coarser level from a finer level. The details are computed as differences between levels.

Figure 5:
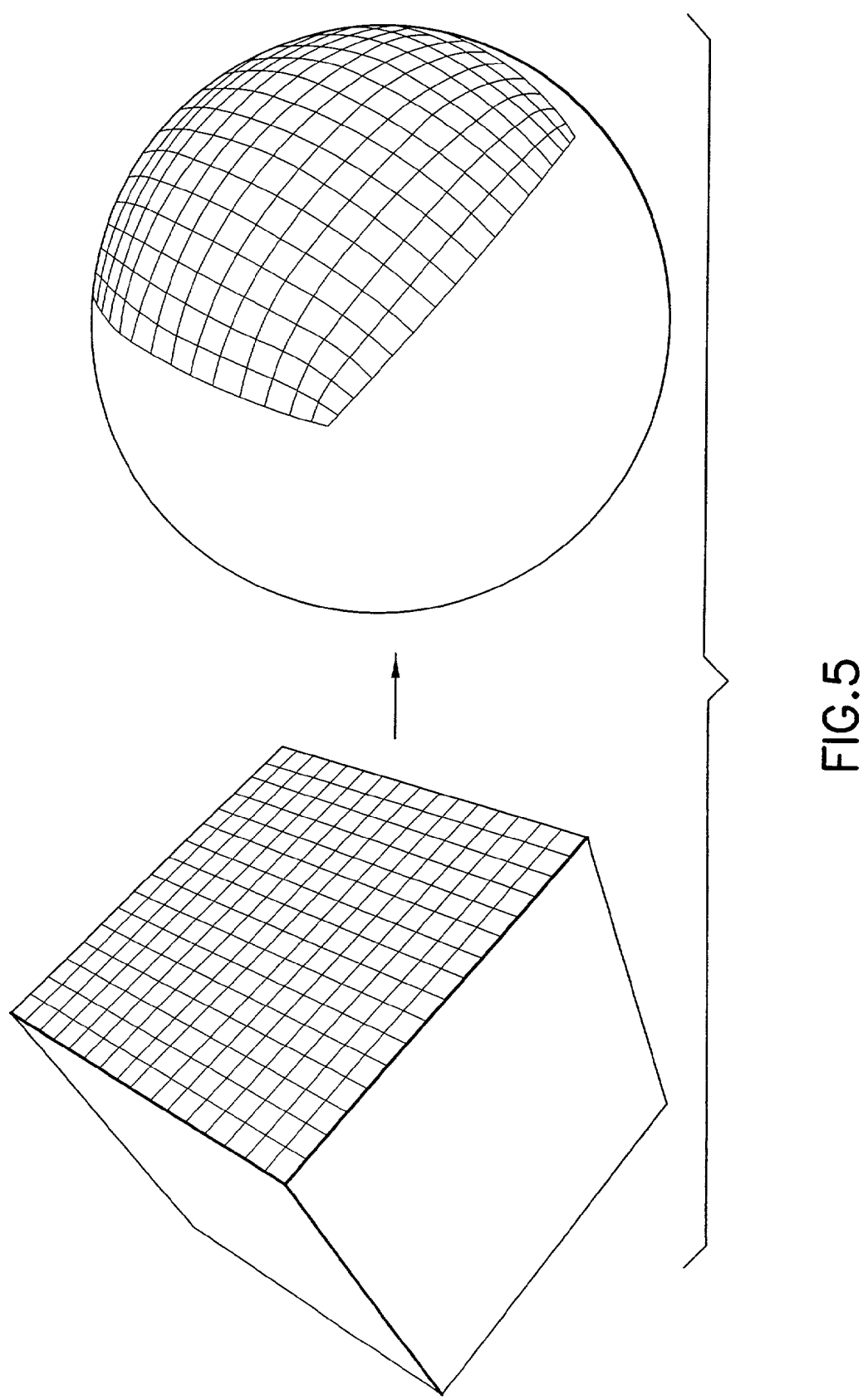
FIG. 5 illustrates a natural parameterization of a subdivision surface.
Figure 6A:
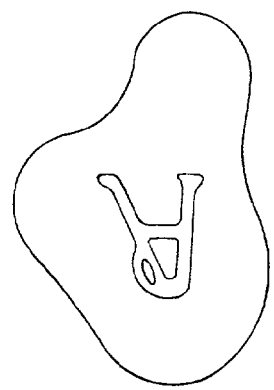
FIGS. 6A–6F, collectively referred to as FIG. 6, illustrate main steps of the pasting algorithm.
Figure 6B:
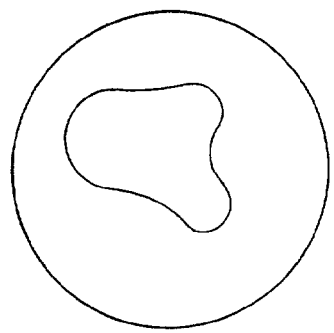
Figure 6C:
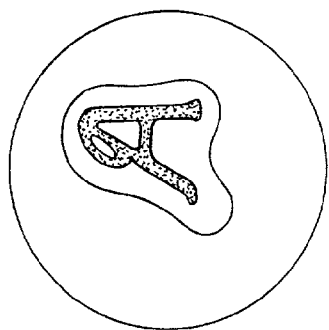
Figure 6D:
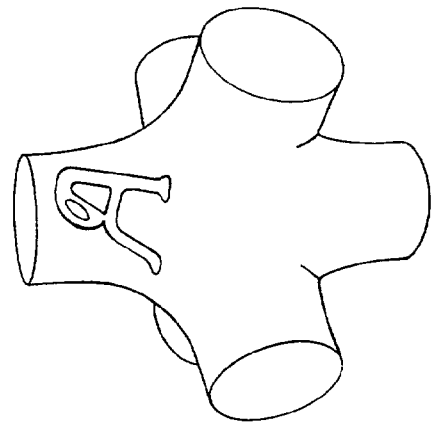
Figure 6E:
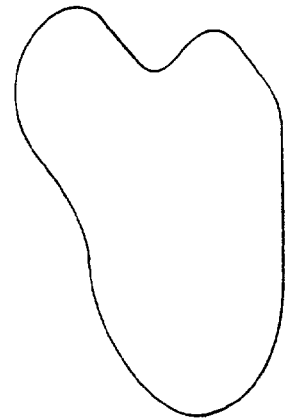
Figure 6F:
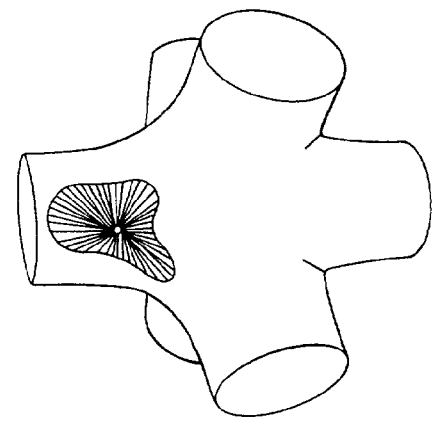

An aspect of multiresolution surfaces that proves to be important for modification operations is that the details are represented in local coordinate frames, which are computed from the coarser level. This is analogous to representing the detail surface in the frame computed from the base surface. For our purposes, it is important to interpret the multiresolution surface as a function on a domain. A multiresolution surface can be naturally viewed as a function on the initial mesh as shown in FIG. 5. Each time the subdivision rules are applied to compute the finer control mesh, midpoint subdivision is also applied to a copy of the initial control mesh. By repeatedly subdividing, a mapping from a denser and denser subset of the control polygon to the control points of a finer and finer control mesh is obtained. In the limit, a map from the control polygon to the surface is obtained.

For simplicity, the ensuing discussion is restricted to parts of surfaces parameterized over planar domains: $M \subset R^2$. Furthermore, it is assumed that these parameterizations are sufficiently smooth. Given two surfaces $(M_1, f_1)$ and $(M_2, f_2)$, where $f_1$ and $f_2$ are their parameterizations, it is desired to paste a feature from one surface to the other, e.g., pasting ornaments 3-20 and 3-30 on to vase 3-10 in FIG. 3. This operation involves separating each surface into two parts: the base surface and the detail surface. The goal is to replace the detail part of the second surface with the detail part of the first. An important operation in this process is correctly transferring details from one surface to the other.

With regard to base and detail surfaces, the base surface $b(x)$ is typically a smoothed or flattened version of the original surface. The detail surface $d(x)$ can be defined as $f(x)-b(x)$. However, to ensure that the offset direction is at least invariant with respect to rigid transformations of the base, it is preferably represented in a local frame. The local frame is a triple of vectors $(n_b, \partial_1 b, \partial_2 b)$ including the normal and two tangents (two partial derivatives of the parameterization). It is convenient to consider these derivatives together as a map Df(differential of f) that maps vectors in the plane to vectors in the tangent plane of the surface. The detail surface is defined then by the triple $d'', d^{t1}, d^{t2}$, which can also be considered as a scalar displacement along the normal $d''$, and a tangential displacement in parametric coordinates $d^t=(d^{t1}, d^{t2})$. Then the equation relating the original surface, base and details can be written as $f(x)=b(x)+Db(x)d^t(x)+n_b(x)d''(x)$, where x is a point in the domain.

With regard now to surface pasting, and with both surfaces separated into the base part and the detail part, one can give a precise definition of pasting. All quantities with index 1 refer to the source surface, from which is extracted the detail surface, and all quantities with index 2 refer to the target surface on which the details are pasted. Assume that the part of the surface that is desired to be pasted is defined over $G_1 \subset M_1$. Let p be a map from $G_1$ to $M_1$ which defines how the surface is pasted. A discussion made below of how p is chosen.

The result of a simple pasting operation is a new surface coinciding with $f_2$ outside $p(G_1)$, which has the same base as $f_2$ but for which the details are taken from the source surface: $f^{pasted}=b_2+(Db_2 Dp d_1^t + n_{b_2} d_1'') \circ p^{-1}$, where all functions are evaluated at a point $x \in p(G_1)$, where o denotes function composition. Note that it is preferred to use the composition of differentials $Db_2 \circ D_p$ to transform the tangential component of details. This establishes a natural map between the local frames on the source and target surfaces.

Figure 4:
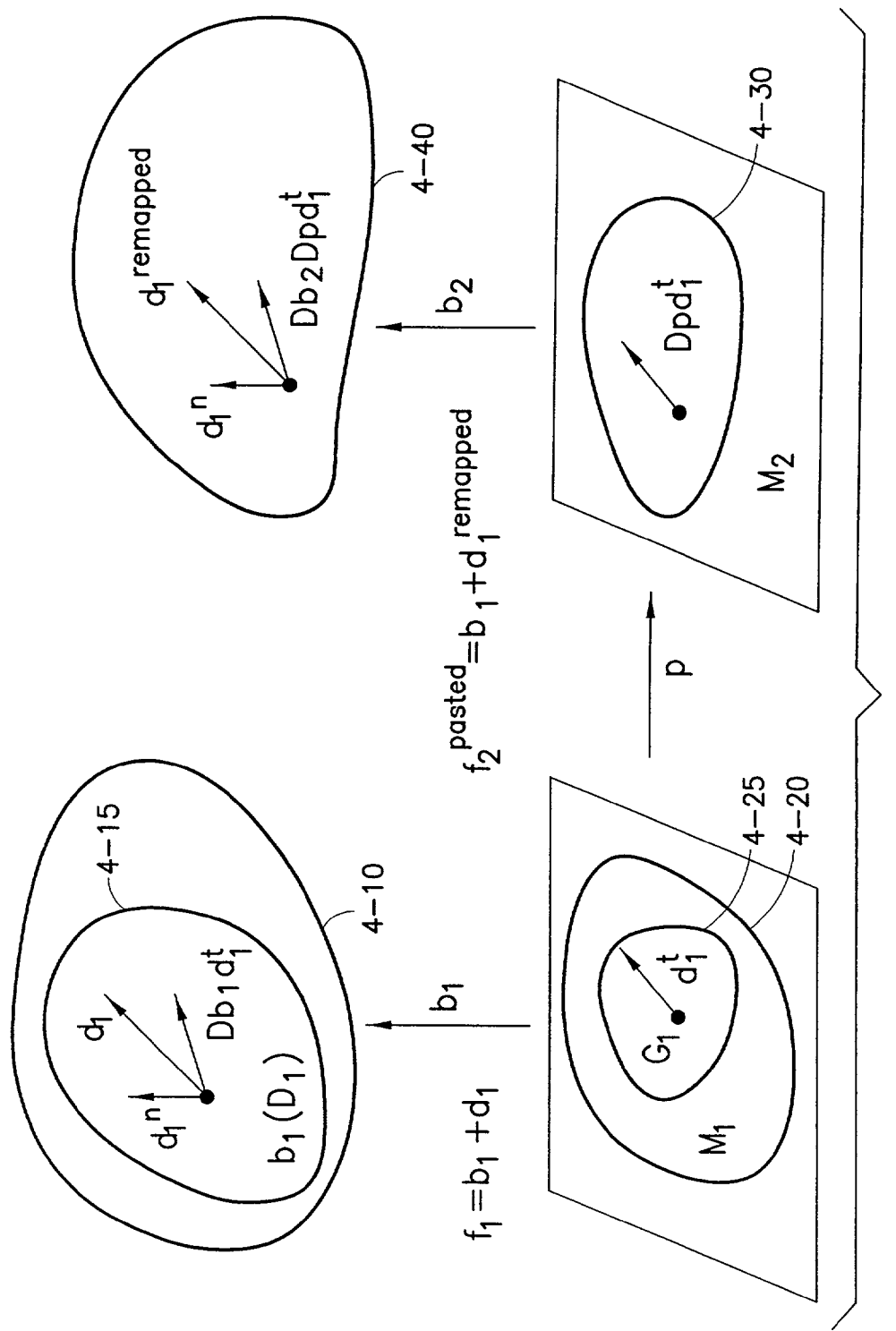
FIG. 4 illustrates a diagram of the surface maps involved in pasting.

FIG. 4 illustrates the different maps involved, where the source surface is 4-10, the selected region is 4-15, the parameterization domain of the source is 4-20, the part of the source being pasted is parameterized over 4-25, the target surface is 4-40, and the target parameterization domain is 4-30.

From this formulation one can observe that two major choices need to be made: the separation of both source and target surfaces into base and detail, and the definition of a pasting mapping p identifying domain $G_1$ with a part of the domain $M_2$. The map p preferably satisfies two conditions: it has to be one-to-one, and it preferably minimizes the distortion of the mapped feature.

With regard to pasting with an intermediate plane, one of the important choices to be made is whether the mapping p from the domain of one surface to the domain of the other surface is constructed directly, or whether it is constructed by using an intermediate planar domain. The latter approach is preferred because it considerably simplifies three tasks: (i) ensuring that the mapping is visually smooth, (ii) minimizing distortion and (iii) resampling the source over the target sampling pattern.

For multiresolution subdivision surfaces, a direct construction of the pasting mapping p is inconvenient for the following reason. Visual smoothness and minimization of distortion are typically achieved by minimizing appropriate functionals. In the case of a direct mapping of the source region to the target surface domain, the values of the mapping are not a part of any affine space. Instead the domain of the surface is a collection of faces of the coarse-level control mesh, so that each point is preferably characterized as (i,u,v), where i is the face identifier (id) and (u,v) are coordinates within the face. Unless the entire surface can be reparameterized on a plane, there is no simple way to compute linear combinations of two arbitrary points (e.g., the midpoint of the interval connecting the points), which makes the application of most common computational techniques very difficult. Even a simple operation such as computing angles of a triangle given three vertices becomes a complicated task.

To avoid these difficulties, it is preferred to parameterize the corresponding areas of the source and target over the plane. The basic approach is to map each surface into the plane as isometrically as possible, and then align the two planar parameterizations using a linear transformation to compensate for the first order distortion. In this case, the pasting map is restricted to a simple class of maps (i.e., linear transformations), but new parameterizations $p^1$ and $p^2$ are constructed for the parts of surfaces of interest for every pasting operation.

A consideration is now made of separating the base surface from the detail. An important step in the pasting process is the definition of which features of the source surface region constitute details that the user desires to paste over the target surface, as opposed to the larger-scale surface shape that should be ignored. Separating the two surface components is not a problem with a precise mathematical solution, and has to be guided by the user. The approach herein is to provide a continuum of base surface choices guided by a single parameter which can be considered to be the flatness of the base surface. A natural way to obtain a smooth base surface, given the multiresolution data representation, is to remove or reduce the multiresolution details present in the multiresolution hierarchy on the finer levels. The degree to which this approach is effective depends on the manner in which the coarser levels were obtained when the hierarchy was constructed. By comparing several approaches (e.g., Taubin's smoothing, quasi-interpolation, and fitting) it was found that that fitting procedures provide the best results for the desired pasting operation.

Figure 7:
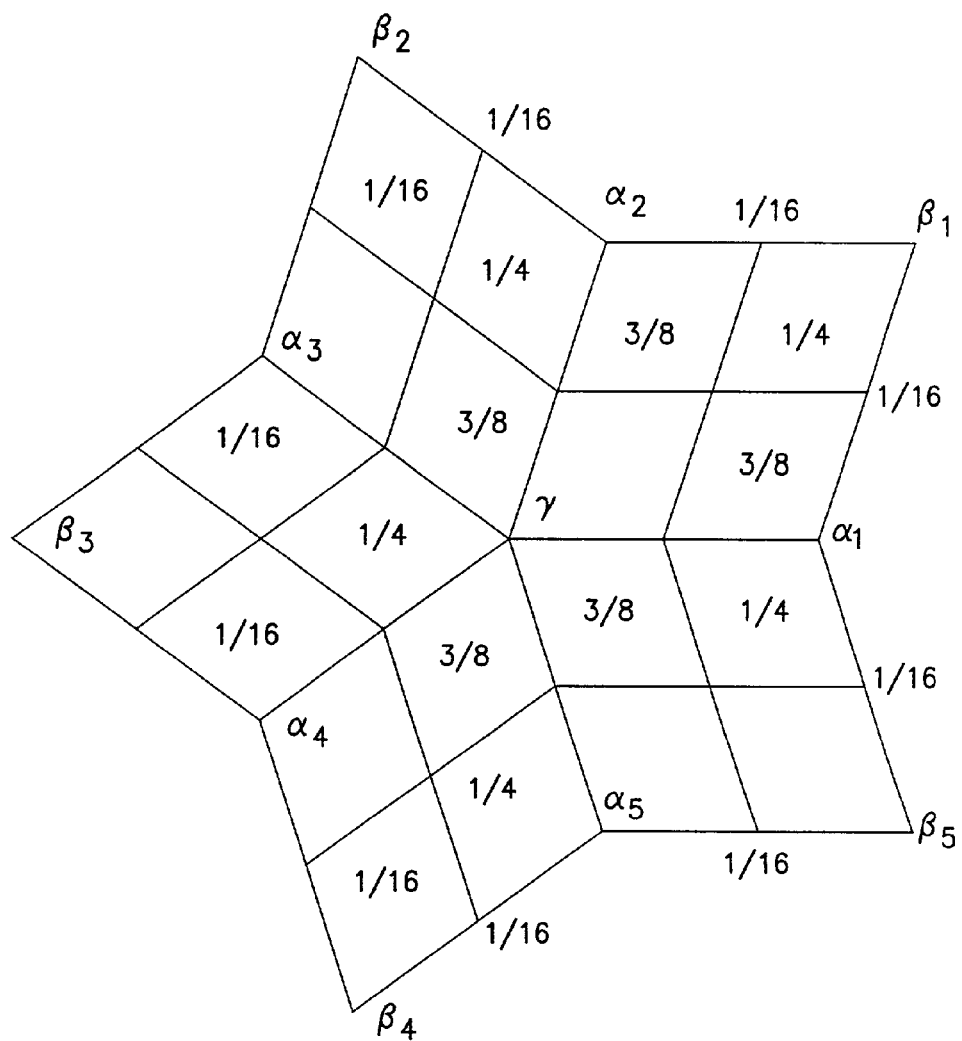
FIG. 7 illustrates local averaging mask used for transpose subdivision.

The presently preferred fitting procedure minimizes a functional that measures how well the smooth surface fits the vertices of the original mesh, subdivided to the finest level M. The minimization problem for level m of the smooth surface hierarchy can be stated as:

$$\min_p \sum_{w \in V^M} \|p_w^M - [S^{M-m} p^p]_w\|^2 \quad (1)$$

where the minimum is computed over all possible choices of control points p for the smooth mesh. $V^M$ is the set of vertices of the finest-level mesh, $S^{M-m}$ is the subdivision matrix for M−m subdivision steps, and $[]_w$ means that the resulting smooth surface is evaluated at parameter values corresponding to vertices w of the control mesh. The minimization problem is equivalent to finding solutions for the linear system $A^T A x = A^T b$, with $A = S^{M-m}$, $b = p^M$, and $x = p^m$, and can be solved by using the Conjugate Gradient method. To apply this method the only operations that are need to be performed, aside from linear combinations of vectors and dot products, are matrix-vector multiplications for the $S^{M-m}$ matrix and its transpose. As the matrix is obtained by an iterative application of the subdivision matrix, there is no need to represent or store it explicitly: applying A corresponds to the application of M−m subdivision steps. Applying $A^T$ to a vector can be interpreted in similar terms. More specifically, as shown in FIG. 7, the mask for each vertex v on level m−1 contains all vertices on level m which are affected by v when subdivision is performed. If vertex v has coefficient α in the subdivision rule used to compute the control point for vertex w, then in the transpose averaging rule for vertex v vertex w has coefficient α. In FIG. 7, the coefficients $\alpha_i$, and $\beta_i$ denote the Catmull-Clark vertex rule coefficients for corresponding vertices. $\gamma = 1 - n\alpha - n\beta$, where n is the valence of the central vertex.

Once the sequence of levels is computed a continuum of base surfaces can be obtained by interpolation. The user can choose one interactively by moving a slider. FIG. 8 illustrates different choices for the base surface of the source model (top row) and the corresponding details pasted onto a target model (bottom row).

Figure 11A:
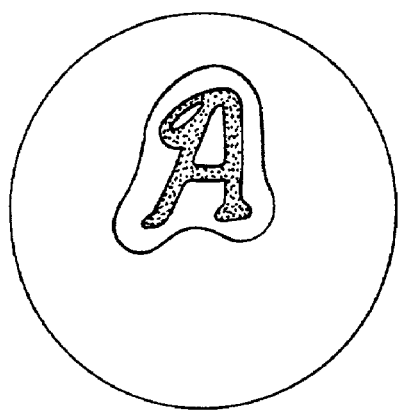
FIGS. 11A–11E, collectively referred to as FIG. 11, illustrate the effects of blending and show, comparatively, pasting with and without blending.
Figure 11B:
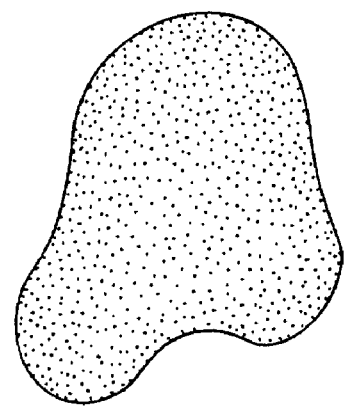
Figure 11C:
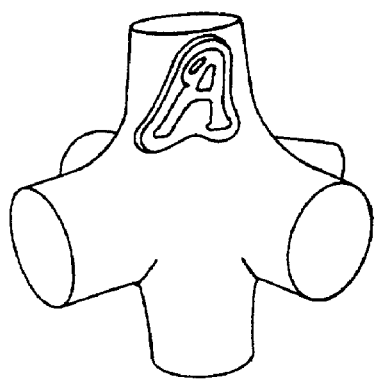
Figure 11D:
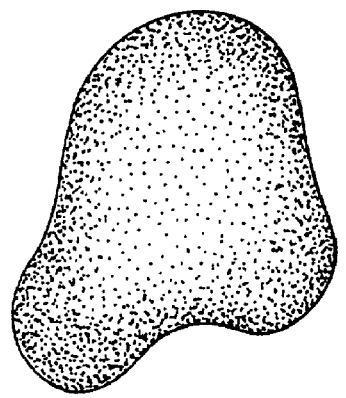
Figure 11E:
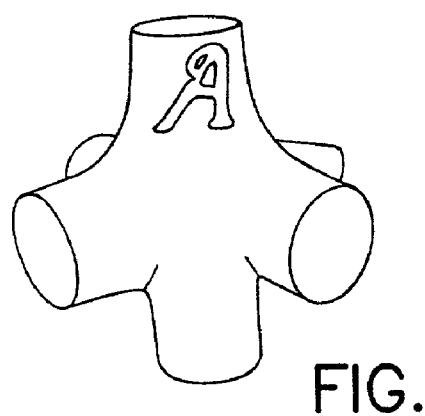
Figure 12A:
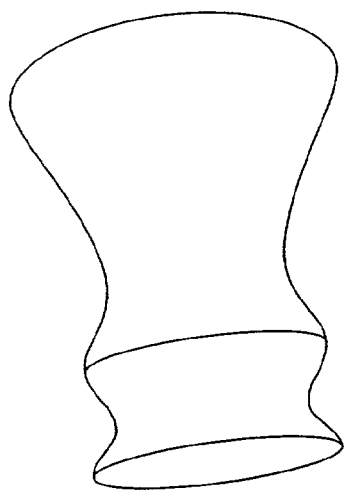
FIGS. 12A–12E, collectively referred to as FIG. 12, illustrate in part the combination of a feature obtained by scanning a physical vase with a displacement map created from a photograph on a simple digital vase model.
Figure 12B:
Figure 12C:
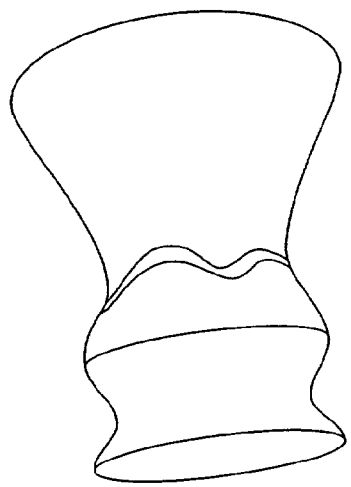
Figure 12D:
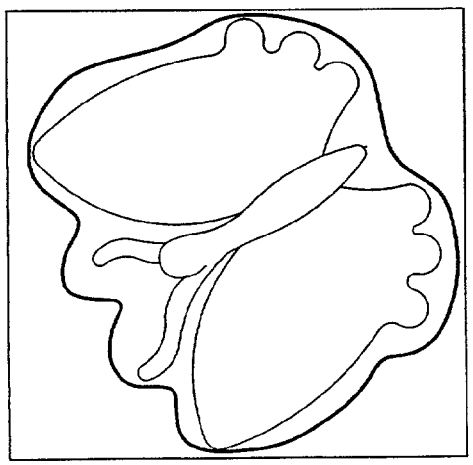
Figure 12E:
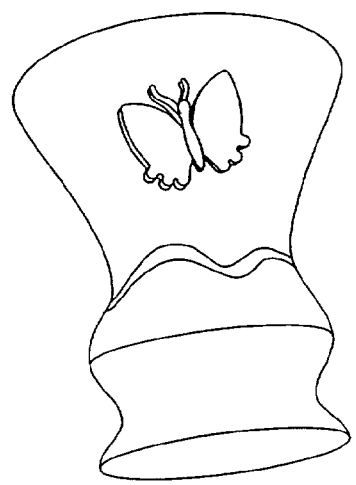

With regard now to boundary constraints, the technique described above explains how to produce smoother approximations of the surface globally. This approach is quite fast, as the base surfaces on different levels can be precomputed and only interpolation is required subsequently. However, when separating the feature from the surface all that is required is a base surface near the feature. Even more importantly, in most cases, the details should gradually decay in magnitude as one approaches the boundary of the feature. To adapt the global base surfaces to the preferred method the following simple blending approach is employed: the local base surface is computed as a blend of the source surface and a global base surface. The region in the interior of the feature is assigned alpha values 1, and all vertices outside the region are given values 0. Next, relaxation is applied for values in the interior while keeping the values outside constant. The amount of relaxation is preferably made user-controllable and allows changing the way features blend into the target surface. The resulting alpha values are used to interpolate between the global base and the source surface. FIG. 11 illustrates the benefits of blending. FIG. 11A shows the selected feature on the source surface. FIG. 11B illustrates initial alpha values (1 inside the feature and 0 outside). When the feature is pasted onto the target without blending (FIG. 11C) boundary effects can be observed. FIG. 11D shows the alpha values smoothed out using the technique described, and the result of pasting using the smoothed alpha values is shown in FIG. 11E. Note the seamless integration of the feature into the base surface.

With regard now to the minimal base surface, it is noted that base surfaces defined by fitting and blending cannot be flatter in the area of the feature than the base surface obtained by fitting on the coarsest level. This might not be appropriate for some applications where it is necessary to retain more of the feature shape (see, for example, FIGS. 14A–14F). In such cases, it is best to define the base surface as a smooth, relatively flat surface that fills the hole remaining after the feature is cut off. To obtain such a surface it is preferred to optimize the membrane energy of the surface inside the feature curve, while constraining its boundary to remain fixed. A multigrid-type approach is preferred for this purpose, which is a natural choice in the context of the multiresolution representation. Similarly, the transition between the feature and the base is handled by assigning alpha values. This allows one to extend the range of possible base surfaces beyond the coarsest-level fitted surface. As a result the user has a choice of base surfaces varying from the minimal surface spanning the outline of the feature to the source surface itself.

Turning now to a discussion of parameterization, once the details have been separated from the base surface, a map from the source base surface to the target is needed in order to be able to transfer the details. The map is constructed in two steps: first, the source surface is mapped to the plane; second, a determination is made of the region on the target surface where the feature will be pasted, and is parameterized onto the same plane. Parameterization is done for both for source and target base surfaces. The type of surface patches that are parameterized are relatively uncommon: while the surface is likely to be quite smooth, the shape of the patch can be relatively complex. The preferred parameterization that is constructed preferably satisfies the following criteria.

1) The parameterization region should not be chosen a priori. The need for this can be seen from the following simple example: the outline of a feature selected on a planar base surface can be arbitrarily complex, however its parameterization should not be different from the surface itself. Any algorithm that requires a fixed domain is thus not likely to perform well in this situation.

2) The parameterization should be guaranteed to be one-to-one. As resampling is typically performed, for each vertex on the target one should identify a unique position on the source. This means that at least the map from the source to the plane should be one-to-one.

3) The parameterization should minimize a reasonable measure of distortion. For developable surfaces ideally it should be an isometry up to a scale factor. The presently preferred algorithm does not explicitly minimize a measure, but it produces superior results with reduced shape distortion compared to other algorithms in situations relevant to the teachings of this invention.

Existing parameterization algorithms in large part do not determine the domain automatically. It is either determined using a heuristic approach, or has to be prescribed by the user. Moreover, until recently, the algorithms that guaranteed a one-to-one parameterization required convex domains, like the many variations of Floater's algorithm. A preferred, but not limiting, parameterization algorithm is one proposed by Sheffer and Sturler, "Surface parameterization for meshing by triangulation flattening", In Proc. 9th International Meshing Roundtable, pages 161–172, 2000.

Before pasting can be performed, an area on the target surface, a target region, corresponding to the desired feature is identified and parameterized. To determine the region covered by the pasted feature one needs to map it to the target; but mapping the feature to the target requires parameterizing the corresponding part of the target over the plane. As parameterizing the entire target is generally not an option, the following approach is preferred: observe that initially one needs to identify only an approximate boundary region where the feature will fit, rather than establishing a one-to-one mapping in the interior. Once the region is identified, it can be parameterized over the plane and a mapping is computed as the composition of the two parameterizations.

The preferred algorithm for identifying the region proceeds in several steps: first, represent the boundary of the source region in a generalized radial form; then use geodesics on the target to map the source boundary points to the target; then connect the boundary points on the target and fill in the interior region. The user has the option to draw a curve on the surface, possibly with several branches, which serves as the spine of the feature. It is desired to aid the system 100 to map the feature to the target surface with the least distortion. As such, if the user does not define a spine, a single point (preferably the centroid of the boundary of the parameterization) is automatically selected to serve as the spine.

The following algorithm is used to parameterize the source boundary. First, the spine is mapped to a curve in the plane by the parameterization. Let $c_0, \ldots, c_{m-1}$ be equispaced points on the spine in the parametric domain. The number of points can be adjusted to trade off computation speed for quality. For each vertex $w_j$ on the boundary of the source parameterization find the closest point $c_i$. Let $n_i$ be the number of points closest to the point $c_i$, $d_j$ be the distance from $c_i$ to $w_j$ and $\gamma_j$ the angle between the direction from $c_i$ to $w_j$ and the spine. If the spine consists of a single point, an arbitrary fixed direction is used as the direction of the spine. The boundary the source region can be characterized by the set of triples $(c_i,d_j,\gamma_j)$, where $i=0, \ldots, m-1$ and $j=0, \ldots, n_i-1$. This collection of triples can be considered as a discrete parameterization of the boundary with respect to the spine generalizing the radial parameterization. In the case of a single point spine, this is just the radial parameterization.

Mapping the spine to the target is straightforward: the user specifies an initial position and orientation for a point on the spine. The other points on the spine are obtained sequentially by walking as follows. Assume that the positions $T(c_0), \ldots, T(c_i)$ are known. If the angle between the intervals $(c_{i-1},c_i)$ and $(c_i,c_{i+1})$ is $\beta_i$, then the next point on the spine is obtained by walking on the target surface in a direction at an angle $\beta_i$ to the previous segment for a distance equal to $|c_{i-1},c_i|$.

Once the positions of all points $T(c_0), \ldots, T(c_{m-1})$ are found on the target, one finds the positions of each boundary point $T(w_j)$ using the corresponding triple $(c_i,d_j,\gamma_j)$. Specifically, the algorithm walks starting from $c_i$ along a geodesic direction forming the angle $\gamma_j$ on the target for a distance $d_j$ to obtain $T(w_j)$. Once all the points on the boundary are found on the target, they need to be connected. This is done by using a plane that passes through the two points $T(w_j)$ and $T(w_{j+1})$ and the normal at one of the points. If both normals happen to be aligned with the direction between the points, an additional point is inserted between them by adding a boundary point on the source midway generating a radial representation for it and adding an extra geodesic path.

A next step traverses the triangles along the intersection of the plane with the surface starting from $T(w_j)$ in the direction of $T(w_{j+1})$. There are three possible outcomes: either one reaches $T(w_{j+1})$ (both points are on the same continuous segment of the plane surface intersection), or one returns to $T(w_j)$, or a boundary is reached. In the last two cases, a new point is added on the boundary of the source region, and the procedure is followed for each pair of points. Once all sequential points $T(w_j)$ on the target surface are connected, a fill algorithm is used to mark the complete region.

Once the target is determined it is mapped to the plane. Generally, the same relatively expensive angle flattening algorithm can be used for target parameterization each time a pasting operation is performed. This enables one to achieve maximum flexibility in feature placement and lowest distortion. While this approach still permits interactive manipulation rates, the frame rate is improved if a large area of the target can be parameterized and the feature moved inside this area. In this case the most computationally expensive operations, target area finding and reparameterization, are completely excluded, and only resampling is done at most steps.

An important aspect of the algorithm for determining the target region is the operation for computing a geodesic emanating from a given point in a specified direction. While a number of algorithms for this or similar problems have been proposed, the application of most interest to this invention has specific requirements. That is, the algorithm should execute rapidly, as the target region should be found at interactive rates. This makes it difficult to use methods based on front propagation. Even more importantly, a continuity property is desired.

Figure 10B:
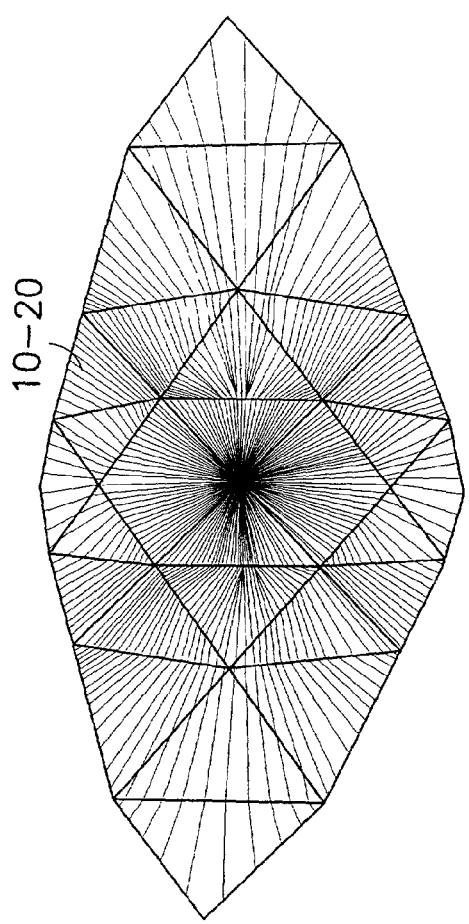
FIGS. 10A–10D, collectively referred to as FIG. 10, illustrate comparatively the straightest geodesics and geodesics in accordance with the teachings of this invention.

Note that termination of the algorithm for finding the target region depends on the ability to make the distance between points $T(w_j)$ on the target arbitrarily small by increasing the density of the points $w_j$ on the source boundary. Such continuity means that as one decreases the angle between two outgoing geodesics for a point, the distance between their endpoints can be made arbitrarily small, as shown by lines 10–20 in FIG. 10B.

Figure 10C:
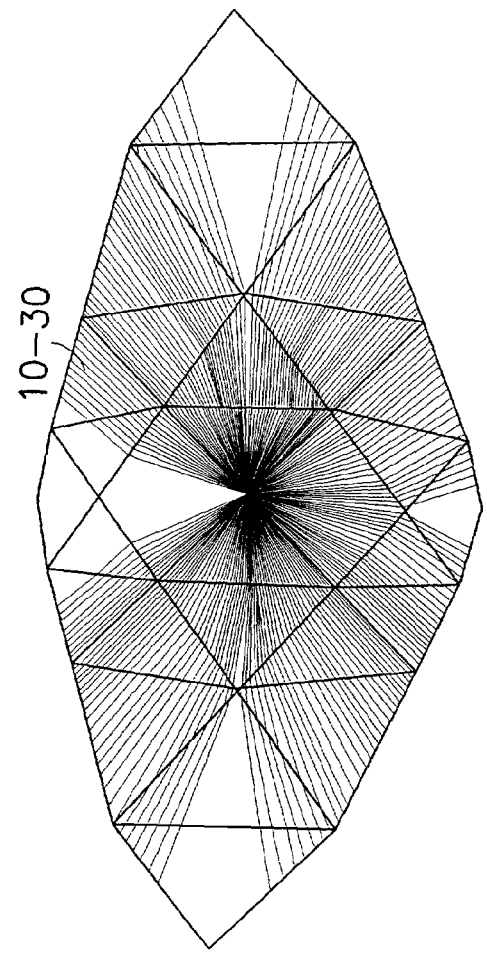
Figure 10A:
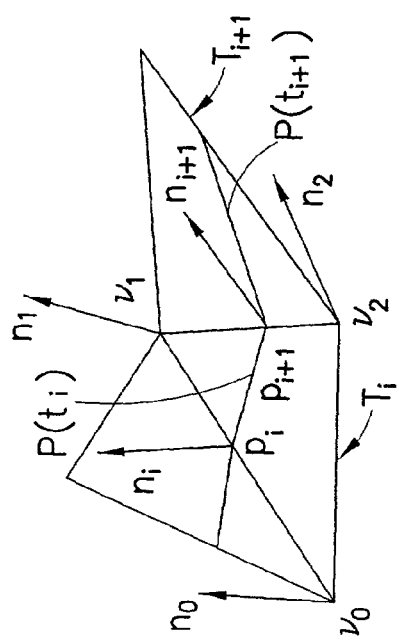
Figure 10D:
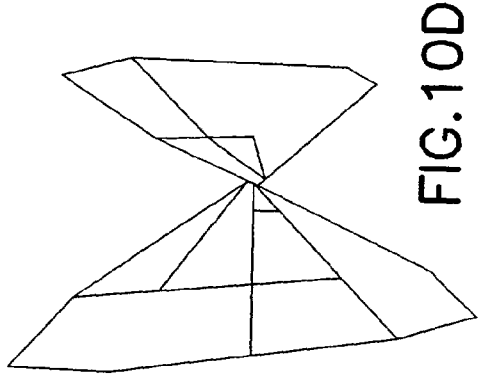

It is known, however, that the straightest geodesics on meshes may violate this condition (known in the art as the "the saddle point problem"), as shown by lines 10–30 in FIG. 10C. Accuracy of the result is of secondary importance, as the process is quite approximate. Also "the swallow tail problem", i.e., the fact that geodesics may intersect near an elliptic point, is not relevant for the preferred applications.

FIG. 10 illustrates the improved results obtained using the preferred geodesic walking algorithm with respect to existing algorithms using straightest geodesics. The results are shown in the context of a simple saddle surface (FIG. 10D). Notice that, using straightest geodesics, some regions of the surface cannot be reached regardless of how dense the geodesics are (note the empty regions in FIG. 10C). However, using the preferred technique all surface regions can be covered by choosing a sufficiently fine sampling. FIG. 10A illustrates the notation used to describe the geodesic walking algorithm.

The presently preferred procedure is based on the fact that the geodesic $g(t)$ is always a locally normal curve i.e., its second derivative $g''(t)$ points along the normal of the surface. By interpolating the normals one can approximate a smooth surface with a continuously changing normal. The elementary step remains in going from triangle to triangle, but the angles are computed differently.

Assume that one begins at a point $p_i$ at the edge $e_0$ of a triangle $T_i$ and $v_0$ and $v_1$ are the vertices of the edge $e_0$; let $n_0$ and $n_1$ be the normals at the vertices $v_0$ and $v_1$. Also compute the normal $n_i$ at the point $p_i$ as the average of the normals $n_0$ and $n_1$. Assume further that there is an initial direction vector $t_i$ defined. The procedure below defines the direction vector at any point of the discrete geodesic to be perpendicular to the normal at the point. If the initial one is not, project it to the plane perpendicular to the normal. To obtain the point $p_{i+1}$ and the new direction $t_{i+1}$ in triangle $T_{i+1}$, perform the following steps (illustrated in FIG. 10A):

1. Intersect the plane spanned by $n_i$ and $t_i$ with $T_i$ to obtain a direction $P(t_i)$. If the plane coincides with the plane of $T_i$ $t_i$ itself is used.

2. Intersect the line along $P(t_i)$ in the triangle with the edges to obtain the point $p_{i+1}$; assuming that the intersected edge is $e_1$ with endpoints $v_1$ and $v_2$. The next triangle $T_{i+1}$ is the triangle across the edge $e_1$.

3. Compute the normal $n_{i+1}$ at $p_{i+1}$ as the average of the normals $n_1$ and $n_2$ at vertices $v_1$ and $v_2$. Project the direction $P(t_i)$ onto the plane perpendicular to $n_{i+1}$ to obtain $t_{i+1}$. If $P(t_i)$ is parallel to $n_{i+1}$, use the average of the projections obtained for two small perturbations of position of the point $p_{i+1}$.

It is possible to prove that this procedure satisfies the continuity requirement if the mesh approximating the surface is sufficiently smooth, i.e., the projection of the ring of triangles around any vertex into the plane perpendicular to the normal is a one-to-one projection.

With regard now to the mapping and resampling operations, once the mappings from the source and target to the plane are established, their planar images are aligned using point and orientation correspondence specified by the user when the target area was chosen. The final step in the remapping algorithm is resampling and combining the details from the source with the details and base surface of the target. For every vertex v of the parameterization of the target that is inside the parameterization domain of the source, the algorithm finds the corresponding quad of the source parameterization. Then u,v coordinates are computed in this quad, and the source is evaluated. The evaluation can be accomplished in at least two ways: for fast resampling, the values of the source at the vertices of the quad are interpolated. For better quality, subdivision surface evaluation is used, in a manner similar to using bilinear filters for fast image editing and bicubic filtering for a higher-quality final result.

In regard now to adaptive refinement and resampling, note that the further away the geometry of the feature is from a displacement map, the less suitable is pasting for surface operations. However, in some cases it is desirable to use the pasting operation to place objects that otherwise cannot be parameterized over the plane without considerable distortion In other cases, the resolution of the source surface is substantially higher than the resolution of the target. In these cases, uniform sampling of the target is not adequate and a form of adaptivity is preferred. While the use of hybrid meshes offers a maximal degree of flexibility, a more conventional approach is presently preferred where only regular refinement of individual faces is allowed. However, rather than quadrisecting individual faces recursively according to a criterion, it is presently preferred to estimate the local density of source samples on a target face, and to directly estimate the subdivision level required for a given face, and refining faces to that level uniformly.

Figure 13C:
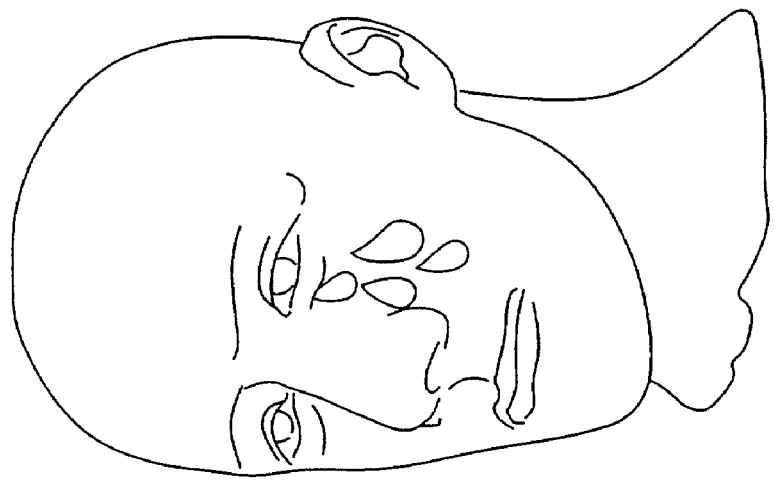
FIGS. 13A–13C, collectively referred to as FIG. 13, illustrate an additional example of a pasting operation.
Figure 13B:
Figure 13A:
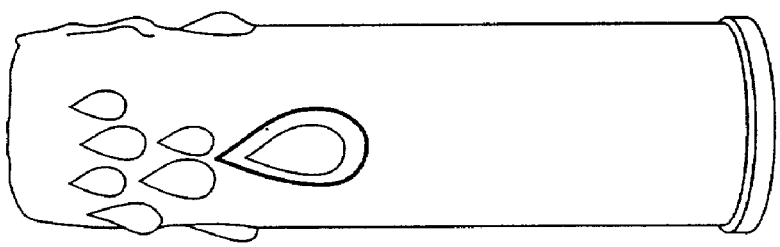
Figure 14G:
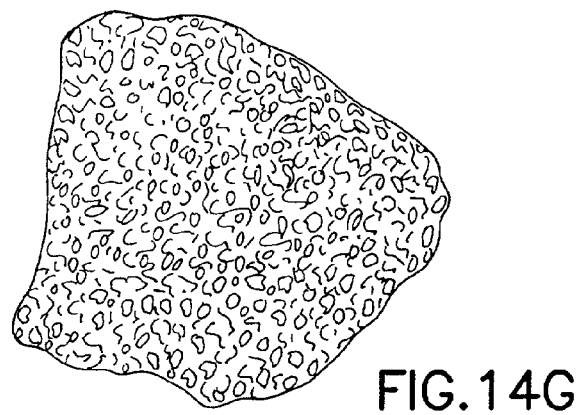
FIGS. 14A–14F illustrate the pasting of a complex feature (an ear) onto a head in different positions and at different scales, while FIGS. 14G–14I demonstrate how a medium-scale feature can be pasted on a surface with or without preserving small-scale detail.
Figure 14H:
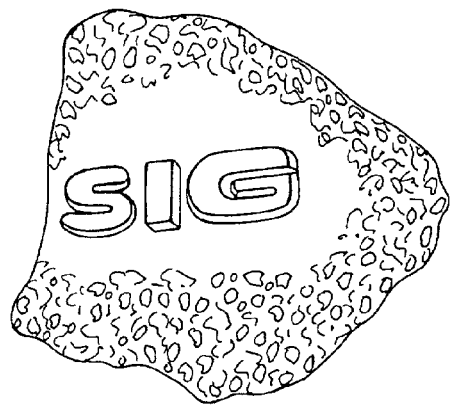
Figure 14I:

A number of models created using the disclosed procedures are shown in FIGS. 12 to 14. FIG. 12 shows how details from a scanned object are pasted on a simple vase model. More specifically, FIG. 12A shows the target model, and FIG. 12B shows the first of two source models, a scanned piece of a physical wine bottle. The selected feature is shown with a solid line. FIG. 12C shows the result of pasting the feature selected in FIG. 12B onto the target in FIG. 12A. FIG. 12D shows a butterfly model as the second source for pasting. The feature of interest is within the solid line. The result of pasting the butterfly feature onto the vase in FIG. 12C is shown in FIG. 12E. In this case, the target object itself serves as the base surface. Similarly, FIG. 13 demonstrates how details from a scanned model can be combined with a different computer model. Detail from a scanned candle (source) shown in FIG. 13A is pasted onto the head model (target) shown in FIG. 13B multiple times, resulting in the model shown in FIG. 13C. FIG. 14 shows examples of feature manipulation on the target surface. Specifically, the source surface (a scanned ear model) is shown in FIG. 14D. The target model (head without an ear) is shown in FIG. 14A. FIGS. 14B, C, E, F illustrate the placement of the source feature in different positions and at different scales on the target surface. FIGS. 14G, H, and I demonstrates how a medium scale detail can be pasted on a surface while preserving small-scale surface details. FIG. 14G illustrates the target surface (scanned rock). FIG. 14H illustrates the pasting of a logo feature onto the rock. Note that the fine textural detail of the rock is not preserved in the region where the logo is pasted. FIG. 14I illustrates pasting with preservation of small-scale detail. FIG. 14 also generally shows examples of feature manipulation on the surface.

In all cases the operations discussed above can be performed interactively, i.e., in real time with user interaction, but the frame rate can vary greatly depending on the complexity of the feature, the complexity of the target region, and the sampling density in the target region. If the target is a simple smooth object, a large area can be parameterized at once without significant distortion, and no dynamic parameterization is required. In this case sufficiently complex models still permit the realization of high frame rates. However, if no large region can be parameterized without distortion, the frame rate varies in a range of frame rates.

While described in the context of presently preferred embodiments, those skilled in the art should appreciate that variations in form and details can be made and that these variations will still fall within the scope of the teachings of this invention.

For example, although described in the context of the underlying representation being in the form of a multiresolution subdivision surface, an important consideration is efficiency. As such, the described algorithms are generally applicable to arbitrary mesh representations.

Further, it should be noted that using a surface obtained by membrane energy minimization as the "flattest" base surface is but one of a number of possible choices.

As yet another example of a modification to these teachings, the invention has been described in the context of the use of an intermediate parameterization to a plane for mapping the source region onto the target surface. This technique is presently preferred for the various reasons discussed above. However, the use of any map (direct or indirect) from source to target is within the scope of the teachings of this invention.

We claim:

1. A computer implemented method for pasting detail from a multiresolution subdivision representation of a source surface onto a multiresolution subdivision representation of a target surface, comprising the steps of:
    separating a source region of interest of said source surface into a source base surface and a source detail surface;
    separating a target region of interest of said target surface into a target base surface and a target detail surface;
    pasting the source detail surface onto the target base surface in accordance with a mapping, where the step of pasting comprises parameterizing and mapping the parameterized regions of interest of the source and target surfaces into an intermediate plane, and aligning the parameterizations using a linear transformation that compensates for first order distortions and where the pasting step comprises a determination of a target region on said target surface, and determining said target region comprises: representing a boundary of said source region in a generalized radial form; using geodesics on said target surface to map source region boundary points to said target region; and connecting the boundary points on said target region and filling in the interion region.

2. A method as in claim 1, where the pasting step comprises a fitting procedure for smoothing a mesh representation of at least said source base surface.

3. A method as in claim 1, where the pasting step comprises an interactive fitting procedure for smoothing a mesh representation of at least the target base surface.

4. A method as in claim 1, where a user draws a curve that is interpreted as a spine of a feature used in mapping the feature to the target surface.

5. A method as in claim 1, where a point is automatically selected by the computer to serve as a spine of a feature used in mapping the feature to the target surface.

6. A method as in claim 5, where said point corresponds to a centroid of the boundary of the parameterization.

7. A computer system comprising at least one data processor coupled to a graphical user interface and to a memory for storing multiresolution subdivision representations of surfaces, said data processor operating in accordance with a stored program for pasting detail from a multiresolution subdivision representation of a source surface onto a multiresolution subdivision representation of a target surface, said stored program operating said data processor for separating a source region of interest of said source surface into a source base surface and a source detail surface; for separating a target region of interest of said target surface into a target base surface and a target detail surface; for pasting the source detail surface onto the target base surface in accordance with a mapping, said pasting operating comprising parameterizing and mapping the parameterized regions of interest of the source and target surfaces into an intermediate plane, and aligning the parameterizations using a linear transformation that compensates for first order distortions and where said pasting operation executed by said data processor comprises a determination of a target region on said target surface, and determining said target region comprises operations of representing a boundary of said source region in a generalized radial form; using geodesics on said target surface to map source region boundary points to said target region; and connecting the boundary points on said target region and filling in the interior region.

8. A system as in claim 7, where said pasting operation executed by said data processor comprises a fitting procedure for smoothing a mesh representation of at least said source base surface.

9. A system as in claim 7, where said pasting operation executed by said data processor comprises an interactive fitting procedure executed in cooperation with said graphical user interface for smoothing a mesh representation of at least source base surface.

10. A system as in claim 7, where a user operates said graphical user interface to draw a curve that is interpreted as a spine of a feature used in mapping the feature to the target surface.

11. A system as in claim 7, where said data processor selects a point to serve as a spine of a feature used in mapping the feature to the target surface.

12. A system as in claim 11, where said point corresponds to a centroid of the boundary of the parameterization.

13. A computer implemented method for extracting detail from a digital representation of a source surface and for applying the extracted detail onto a digital representation of a target surface, comprising the steps of:
separating source detail from a source base surface;
separating target detail from a target base surface;
parameterizing said source base surface onto a plane;
parameterizing a boundary of a detail region of said source surface, said detail region containing said source detail;
specifying an initial position and orientation of said source detail on said target surface;
parameterizing a target region on said plane so as to surround said specified initial position of said source detail on said target surface;
resampling said source detail on a topology of said target region of said plane to form a resampled detail;
pasting said resampled detail onto said target surface by combining together said target base surface, said target detail and said resampled source detail and where the pasting step comprises a determination of a target region on said target surface, and determining said target region comprises: representing a boundary of said source region in a generalized radial form; using geodesics on said target surface to map source region boundary points to said target region; and connecting the boundary points on said target region and filling in the interior region.

14. A method as in claim 13, where the steps of separating are each performed using at least two base surfaces having different values of a parameter that represents surface flatness, and where one of the base surfaces is selected interactively by a user.

15. A method as in claim 13, where the steps of separating are performed using at least two base surfaces having different values of a parameter that represents surface flatness, and where one of the two base surfaces is selected automatically without intervention by a user.

16. A method as in claim 13, where the steps of parameterizing said source surface and said target region onto said plane include a step of aligning source and target planar parameterizations using a linear transformation to compensate for first order distortion.

17. A method as in claim 13, further comprising parameterizing the boundary of the source region by distance from a spine, and computing a covering by disks.

18. A method as in claim 17, where the spine is specified by a user drawing a curve on the source surface, said curve functioning as the spine of the source feature.

19. A method as in claim 17, where the spine is specified by the computer to be a single point corresponding to the centroid of the source feature.

20. A method as in claim 17, further comprising mapping the spine to the target surface.

21. A method as in claim 13, where determining said target region comprises geodesic walking.

22. A method as in claim 21, where geodesic walking comprises, when beginning at a point $p_i$ at the edge $e_0$ of a surface triangle $T_i$ where $v_0$ and $v_1$ are the vertices of the edge $e_0$ and $n_0$ and $n_1$ are the normals at the vertices $v_0$ and $v_1$, and $t_i$ is an initial direction vector:
computing the normal $n_i$ at the point $p_i$ as an average of the normals $n_0$ and $n_1$; and
obtaining the point $p_{i+1}$ and the new direction $t_{i+1}$ in triangle $T_{i+1}$, by
intersecting the plane spanned by $n_i$ and $t_i$ with $T_i$ to obtain a direction $P(t_i)$, where if the plane coincides with the plane of $T_i$, $t_i$ itself is used;
intersecting the line along $P(t_i)$ in the triangle with the edges to obtain the point $p_{i+1}$, and assuming that the intersected edge is $e_1$ with endpoints $v_1$ and $v_2$, the next triangle $T_{i+1}$ is the triangle across the edge $e_1$;
computing the normal $n_{i+1}$ at $p_{i+1}$ as the average of the normals $n_1$ and $n_2$ at vertices $v_1$ and $v_2$; and
projecting the direction $P(t_i)$ onto the plane perpendicular to $n_{i+1}$ to obtain $t_{i+1}$, where if $P(t_i)$ is parallel to $n_{i+1}$, the average of the projections obtained for two small perturbations of position of the point $p_{i+1}$ is used.

23. A method as in claim 13, where said digital representations of said source and target surfaces are expressed as multiresolution subdivision surfaces.

24. A computer readable media having stored therein or thereon instructions for implementing a method for pasting detail from a multiresolution subdivision representation of a source surface onto a multiresolution subdivision representation of a target surface, said instructions implementing the method for separating a source region of interest of said source surface into a source base surface and a source detail surface; separating a target region of interest of said target surface into a target base surface and a target detail surface and pasting the source detail surface onto the target base surface in accordance with a mapping, where the step of pasting comprises parameterizing and mapping the parameterized regions of interest of the source and target surfaces into an intermediate plane, and aligning the parameterizations using a linear transformation that compensates for first order distortions and where the pasting step comprises a determination of a target region on said target surface, and determining said target region comprises: representing a boundary of said source region in a generalized radial form; using geodesics on said target surface to map source region boundary points to said target region; and connecting the boundary points on said target region and filling in the interior region.

25. A computer readable media as in claim 24, where the pasting step comprises a fitting procedure for smoothing a mesh representation of at least said source base surface.

26. A computer readable media as in claim 24, where the pasting step comprises an interactive fitting procedure for smoothing a mesh representation of at least said target base surface.

27. A computer readable media as in claim 24, where a user draws a curve that is interpreted as a spine of a feature used in mapping the feature to the target surface.

28. A computer readable media as in claim 24, where a point is selected by the computer to serve as a spine of a feature used in mapping the feature to the target surface.

29. A computer readable media as in claim 28, where said point corresponds to a centroid of the boundary of the parameterization.

30. A computer implemented method for pasting detail from a representation of a source surface onto a representation of a target surface, said representations comprising arbitrary mesh representations, the method comprising the steps of:

separating a source region of interest of said source surface into a source base surface and a source detail surface;

separating a target region of interest of said target surface into a target base surface and a target detail surface;

pasting the source detail surface onto the target base surface in accordance with a mapping that is one of a direct mapping or an indirect mapping, where the step of pasting comprises parameterizing and mapping the parameterized regions of interest of the source and target surfaces and aligning the parameterizations, where the pasting step comprises a procedure for smoothing the mesh representation of at least said source base surface and a procedure for smoothing the mesh representation of at least the target base surface and where the pasting step comprises making a determination of a target region on said target surface by representing a boundary of said source region in a generalized radial form and using geodesics on said target surface to map source region boundary points to said target region.

31. A method as in claim 30, where a user draws a curve that is interpreted as a spine of a feature used in mapping the feature to the target surface.

32. A method as in claim 30, where a centroid of a boundary of the parameterization is automatically selected by the computer to serve as a spine of a feature used in mapping the feature to the target surface.

* * * * *

UNITED STATES PATENT AND TRADEMARK OFFICE
CERTIFICATE OF CORRECTION

PATENT NO. : 7,076,117 B2
APPLICATION NO. : 10/152258
DATED : July 11, 2006
INVENTOR(S) : Biermann et al.

Page 1 of 1

It is certified that error appears in the above-identified patent and that said Letters Patent is hereby corrected as shown below:

The following error appears in the above-identified Letters Patent:

In Claim 1, Column 14, line 15 delete "interion" and replace with -- interior --.

Signed and Sealed this

Twenty-first Day of November, 2006

JON W. DUDAS
*Director of the United States Patent and Trademark Office*